United States Patent
Caulfield et al.

[15] 3,635,538
[45] Jan. 18, 1972

[54] STACKED HOLOGRAM APPARATUS

[72] Inventors: Henry John Caulfield; Donald H. McMahon, both of Carlisle; Richard A. Soref, Chestnut Hill, all of Mass.

[73] Assignee: Sperry Rand Corporation, Great Neck, N.Y.

[22] Filed: Feb. 27, 1970

[21] Appl. No.: 14,925

[52] U.S. Cl. .............................................. 350/3.5, 350/150
[51] Int. Cl. ........................................................ G02b 27/00
[58] Field of Search ............. 350/3.5, 150, 157; 340/173 LT, 340/173 SS, 173 MA, 174.1 M

[56] References Cited

UNITED STATES PATENTS

| | | | |
|---|---|---|---|
| 2,982,176 | 5/1961 | Kay | 350/3.5 |
| 3,423,736 | 1/1969 | Ash et al. | 340/173 |

OTHER PUBLICATIONS

Vitols, IBM Technical Disclosure Bulletin, Vol. 8, No. 11, April 1966 pp. 1,581– 1,583

Chen et al., Applied Physics Letters Vol. 13, No. 7, Oct. 1968, pp. 223– 225

Tait et al., IBM Technical Disclosure Bulletin Vol. 11, No. 12, May 1969, p. 1,636

*Primary Examiner*—David Schonberg
*Assistant Examiner*—Ronald J. Stern
*Attorney*—S. C. Yeaton

[57] ABSTRACT

A data storage device including a stack of birefringent crystalline holographic plates serially disposed in the path of a playback beam and further including means cooperating with the holographic plates for selectively activating one of them to produce an image of the data recorded therein.

2 Claims, 6 Drawing Figures

PATENTED JAN 18 1972

INVENTORS
HENRY J. CAULFIELD
DONALD H. McMAHON
RICHARD A. SOREF
BY
*H.P. Ferry*
ATTORNEY

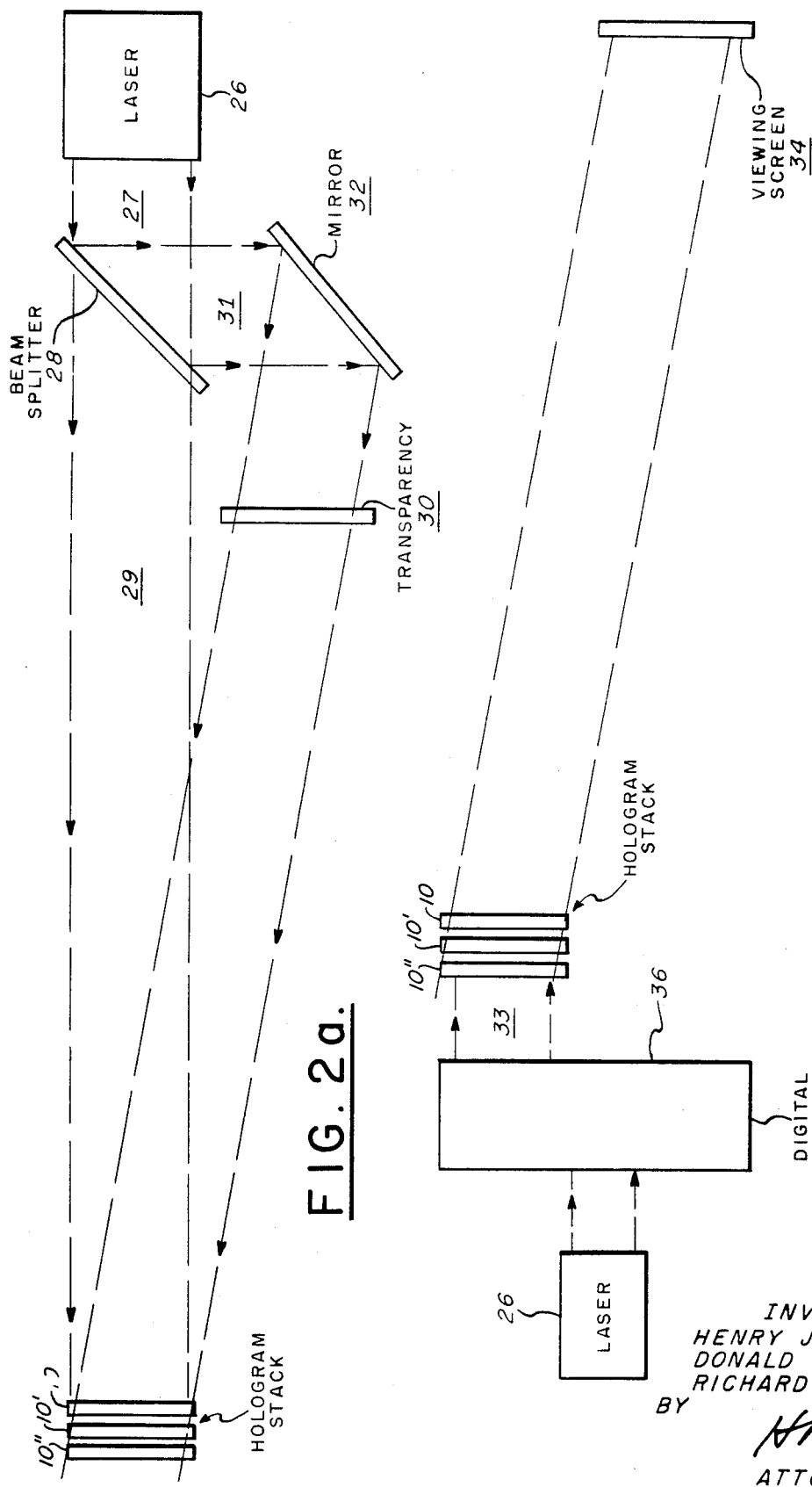

STACKED HOLOGRAM APPARATUS

BACKGROUND OF THE INVENTION

1. Field of the Invention

The present invention relates to holographic apparatus and more particularly to holographic storage devices comprising a plurality of stacked holograms arranged for selective readout.

2. Description of the Prior Art

The three-dimensional image reconstruction aspect of holography has been well popularized in the last several years but more recently the holographic art has received additional attention because of the high information storage capacity potential which it appears to offer. In the latter respect, most effort has been directed toward the development of angular multiplexing schemes wherein a multiplicity of holograms are recorded on a single holographic plate by varying the angle of incidence of the reference beam relative to the signal beam or, alternatively, by changing the angular orientation of the plate relative to the incident signal and reference beams for successive recordings. Playback of the recorded signal information is accomplished in the same manner, that is, by controlling the angle of the reference (playback) beam or reorienting the holographic plate for selectively reconstructing the signal information recorded in any one of the holograms which it is desired to read out. Thus, a holographic storage device constructed in this manner could perform the same function as a microfilm library in less space and with more rapid access. In the interest of simplifying the configuration of the holographic recording apparatus and eliminating the necessity for relative motion between components, the reference beam angle control method is presently being actively investigated by researchers in the art. It is recognized, however, that formidable design problems will have to be surmounted to obtain a satisfactory angle multiplexing device capable of both high resolution and multiangle selectivity. An analog (continuous) light beam deflector might be suitable for this purpose but it is more likely that a multiple stage digital light deflector will be required in order to assure uniformity and repeatability of the selected light beam angles for recording and playback. In the present state of the art, digital light deflectors capable of directing a beam in a plurality of distinct angularly separated directions are encumbered by the necessity for utilizing a plurality of individual light-deflecting stages, each comprising polarization orienting components in addition to the light-deflecting component and possibly also requiring isolator components to preclude cross talk between the respective stages. Moreover, it will be appreciated that for extremely high storage capacity, say $10^{10}$ bits, the angle selective capacity of the deflector would become inordinately large and possibly even unfeasible. Further, in view of the resolution limit of presently available holographic media it appears that even if a satisfactory light deflector was provided the required size of the recording medium would become excessively large, perhaps as much as 1 square meter for recording capacity on the order of the above-mentioned figure.

The present invention is directed toward alleviating this problem by reducing the bit capacity required of the light deflector while simultaneously utilizing the resolution capability of available recording media. Accordingly the present invention provides apparatus in which the readout selection is dependent not only on the orientation of the playback beam but also on which of a plurality of holograms positioned in the path of the beam is selected for reconstructing stored data. This is accomplished by cascading several holographic plates, each storing separate data, to form a stack of plates in the path of the playback beam and further providing means for enabling the reference beam to be effective in reading out the information on any selected hologram in the stack. A two-dimensional array of such stacks can be arranged proximate a light beam deflector which operates to direct the playback beam to one of the stacks which in turn has one of its holograms activated for readout.

SUMMARY OF THE INVENTION

In a preferred embodiment of the invention the signal information to be stored is recorded in an electrically controllable volume holographic crystalline device of the type described in U.S. Pat. application Ser. No. 837,665, filed in the name of James B. Thaxter and assigned to the assignee of the present invention. In these devices reconstruction of the wave front which produces an image of the recorded data is dependent on the presence or absence of an electric field applied to the hologram. In the absence of the electric field the playback beam passes through the hologram unobstructed by the interference pattern recorded therein and thus a diffraction lobe representative of the recorded data is not produced. Upon application of the electric field, however, the hologram becomes effective to reproduce an image of the recorded data. Moreover, by appropriate arrangement of the direction of the recording and playback beams a real image is reproduced for presentation on a viewing screen. As will be explained more fully in the subsequent detailed description of the preferred embodiments, particular placement of the individual holograms of the stack relative to the incident light beams during recording and reconstruction must to observed to assure proper operation. Readout of any desired information is accomplished simply by applying the electric field to the related hologram.

In another embodiment of the invention the electrically controllable holograms are replaced by crystals which need not be responsive to an applied electric field insofar as the holographic reconstruction is concerned. The information in the crystal must, however, be highly polarization sensitive. In this instance an electrically controlled polarization switch is positioned adjacent each side of the respective holographic plates. The same restrictions as to placement of the various components relative to the light beams are applicable to this embodiment as mentioned with respect to the electrically controllable holographic embodiment discussed in the preceding paragraph. Readout of data inscribed on selective holograms is performed by energizing the polarization switches on each side thereof. Under this condition the holograms for which the associated polarization switches remain deactivated have no effect in reconstructing recorded data. The hologram intermediate the energized switches, on the other hand, produces a diffraction lobe representative of the signal information recorded thereon. Operation in this manner is based on the polarization of the reconstructing reference beam being normally oriented in such a way that it does not interact with the recorded interference patterns of the respective holograms. On being reoriented by operation of the polarization switch to the front of the selected hologram, however, the reference beam interferes with the recorded diffraction pattern. The other polarization switch reverts the reference beam to its original polarization in that it does not affect any of the remaining holograms.

BRIEF DESCRIPTION OF THE DRAWINGS

FIGS. 2a and 2b are plan view schematics of apparatus for respectively recording and reading out information stored in one arrangement of stacked holograms embodying the principles of the invention.

DESCRIPTION OF THE PREFERRED EMBODIMENTS

Figure 1A:
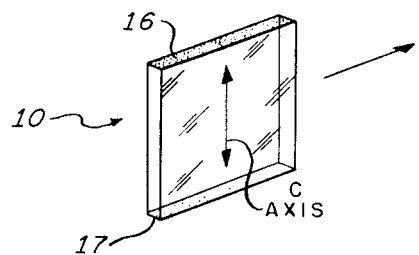
FIGS. 1a, 1b and 1c are perspective illustrations respectively of a crystalline holographic plate, a holder for the plate, and a mounting fixture for stacking a plurality of the plates in accordance with the teaching of the present invention.
Figure 1B:
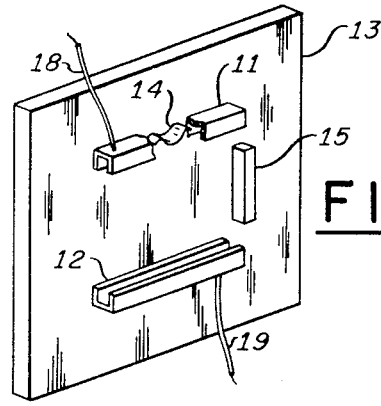
Figure 1C:
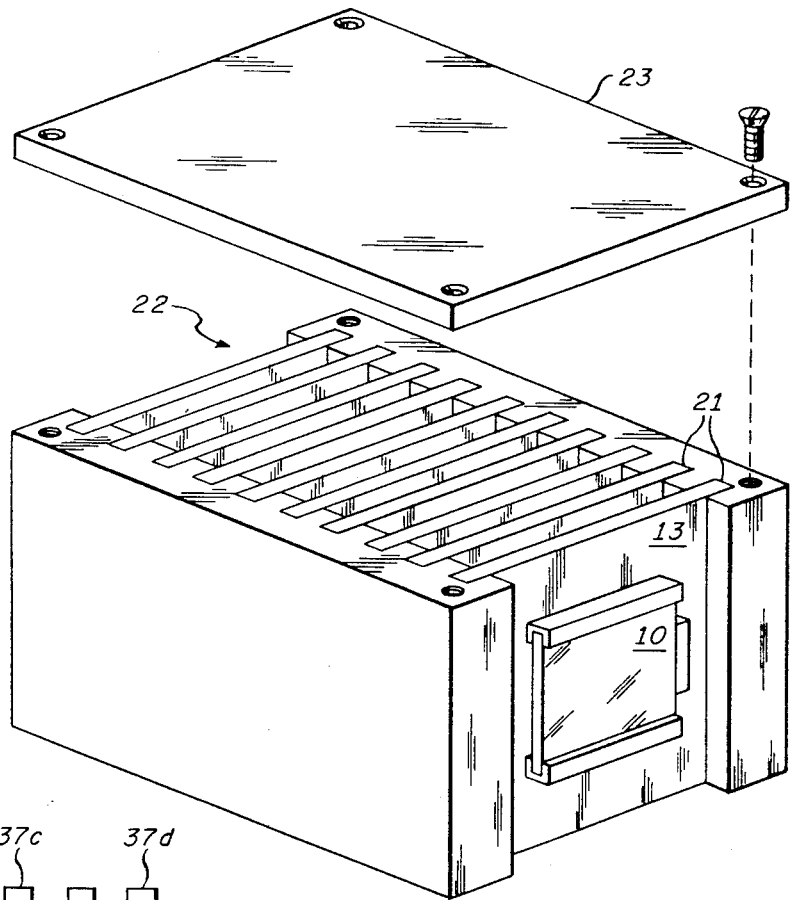

Referring to FIGS. 1a, 1b and 1c, a polar crystalline member 10 constructed of a material such as strontium barium niobate (SBN), capable of functioning as a holographic recording medium, is inserted into metallic slot members 11, 12 affixed to plexiglass holder 13. Uniform alignment of the crystal on the holder is provided by means of spring 14 in the upper slot member forcing against the top edge of the crystal with the right edge thereof firmly against insulator stop 15 secured to the holder in normal relation to the slot members. Electrodes 16 and 17 are formed on the top and bottom edges of the crystal, for example, by applying silver paint thereto, for the purpose of connecting a source of electrical excitation to the crystal by way of leads 18, 19 coupled to the metallic slot members. In the case of the upper slot member, the excitation is applied to electrode 16 through the spring 14 while in the case of the bottom slot member, direct contact is established with electrode 17. It will be noted that the C-axis of the crystal is preferably vertically oriented so as to be aligned with the electric field established in the crystal upon application of a DC voltage to the electrode leads.

After securing the crystal in the holder it is inserted into guide slots 21 in fixture 22 which can be made of any easily machined material. As indicated in FIG. 1c, a plurality of the crystal-holder subassemblies are positioned in fixture 22 in uniformly spaced relation to one another preparatory to recording signal information in the crystals. The electrical leads connecting to the various crystal-holder subassemblies are brought through fixture 22 at any convenient location for coupling to the external power source. A cover 23 can be screwed onto the top of fixture 22 to assure that the crystals remain precisely secured therein. There is no particular limitation on the number of crystals which can be stacked but, for the purpose of providing some indication of the dimensions involved, a ten crystal stack will be considered. Both the crystal and the plexiglass holder can typically be made about 0.1 centimeter thick with the former having width and height dimensions of about one centimeter and the latter having corresponding dimensions of about 2 centimeters. For ease of handling and stacking the crystal-holder subassemblies in the mounting fixture, a spacing of about 0.25 centimeters between adjacent holders is sufficient. Thus, for a 10-crystal array the overall length of the stack will be approximately 3.5 centimeters. It will be recognized that fabrication of a lengthy crystal would enable several discrete holographic layers to be formed in a unitary crystalline device provided sufficient spacing was maintained between adjacent hologram layers to preclude coupling therebetween. In any event, even when separate crystals are stacked care must be exercised to assure that electrode arcing does not occur around the crystals. Immersion of the crystals in an oil bath of suitable transparency and refractive index and possessing appropriate insulating qualities can be useful toward this end.

As explained in the aforementioned Thaxter application Ser. No. 837,665, the operation of crystalline members as holographic recording media is based on the formation therein of a phase grating represented by localized refractive index inhomogeneities which are optically induced in the crystal by interference between the two light beams incident thereon, that is, a grating is formed by a spatially modulated refractive index pattern which is produced in the crystal in response to the interfering light beams, the grating being inherently formed without the necessity for developing or processing as in the case of film. Moreover, electrical control of the interference process can be realized when proper crystalline materials are used. For instance, strontium barium niobate having the chemical notation $Sr_x Ba_{(1-x)} Nb_2 O_6$ where $x$ is greater than 0.25 and less than 0.75, has been found to yield reconstructed images of high efficiency and good quality while simultaneously enabling recording with comparatively low light intensities.

The apparatus and method of recording separate signal data in the respective crystalline holographic plates and selectively reading out the recorded data will now be described with reference to FIGS. 2a and 2b. For simplicity of illustration and discussion only three crystal members in exaggerated spaced relation are included in these figures which are devoid of the other components shown in FIG. 1c. In the view shown in FIGS. 2a and 2b, the C-axis of the crystals and the electric field established therein are both oriented normal to the plane of the drawing. Laser 26 provides a light beam 27 incident on beam splitter 28 which transmits approximately half of the light energy as reference beam 29 propagating directly through the serially disposed array of crystals 10, 10', 10''. The other half of the light energy in laser beam 27 is reflected from beam splitter 28 as signal beam 31 onto mirror 32 from which it is reflected through transparency 30 and then through the crystals in substantially superimposed relation thereon with reference beam 29. The information content of transparency 30 is recorded in crystal 10 simply by applying a DC voltage to that crystal. Under this condition a holographic phase grating representative of the information on the transparency is established in energized crystal 10 by virtue of the interference therein between the reference and signal beams, while in crystals 10' and 10'' the light beams propagate therethrough with very small interaction between them, orders of magnitude less than in the crystal having the voltage applied to it. Different information is stored in the remaining crystals 10' and 10'' in the same manner by replacing transparency 30 with a new transparency for each successive recording and simultaneously applying electrical excitation to a corresponding crystal. The reference and signal beams can be polarized in any like, random fashion for the purpose of recording but since extraordinary poled light, that is, light plane polarized parallel to the crystal C-axis, is most useful for reconstruction (readout), it is preferable for the recording beams to be similarly polarized inasmuch as optimum results are obtained in this manner.

Referring to FIG. 2b, readout of the stored data is accomplished by directing a light beam from laser 26 onto the holographic stack comprising crystals 10, 10' and 10'' and selectively energizing the particular crystal from which data is desired to be obtained. Readout beam 33 is directed along the same path as used for recording the transparency data but is propagated in the opposite direction. This is done to provide a real image on viewing screen 34 placed at the position occupied by the transparencies and in the same relative location to the hologram stack. In this way it is assured that the reconstructed image of any recorded information will be presented at the precise location of the viewing screen. On the other hand, if it is desired to play back the recorded data from various crystals in nonoverlapping relation the respective recording transparencies can be placed in different locations, side by side or one above another, whereupon the reconstructed image will appear on the viewing screen in a position corresponding to that occupied by the transparencies during recording. The data recorded in any one of the crystals is read out simply by applying a DC voltage to its electrodes. As explained in the aforementioned Thaxter application, the reconstructed image has maximum brightness when the readout voltage is of about the same amplitude as that used for recording. Decreasing the voltage causes a concomitant reduction in the image brightness until at or near the condition of zero voltage no image is produces. Thus, each hologram when deenergized or in the nonreconstructing state has an inappreciable affect on the spatial phase or intensity distribution of the readout light beam passing through it. Consequently, any zero order (nondiffracted) light as well as the first order diffracted (data carrying) light emerging from the energized crystal passes through the remaining crystals unaffected by the interference patterns recorded therein.

The crystals required for electrical control in the aforedescribed manner must be of the polar type, that is, capable of being poled or having their spontaneous electric polarization aligned with respect to an axis dictated by the crystallographic structure. Such materials are ferroelectric in nature and thus exhibit a square polarization versus applied electric field characteristic. In addition, of course, the crystalline material must be one that is susceptible to having refractive index inhomogeneities induced in it by electro optical means. Alignment of the electric field with the crystallographic axis of symmetry (the C-axis) is not essential but is preferably used to obtain optimum results.

The digital light deflector 36 disposed intermediate laser 26 and the hologram stack has utility in systems incorporating a plurality of stacks arranged in either a lineal or two-dimensional array. The light deflector functions in such systems to direct the readout beam 33 to one of the multiplicity of stacks. Lenses and/or mirrors can be used in conjunction with the light deflector for directing the readout beam perpendicular to the hologram stack. Readout of prescribed information then depends on both the stack to which the readout beam is directed and the particular hologram in that stack which is selected for energization. The light deflector obviously can also be utilized as part of the recording apparatus, if desired.

Figure 3:
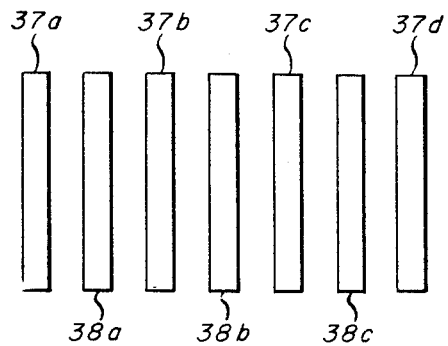
FIG. 3 is a schematic presentation of an alternative configuration of stacked holograms which can be used in the apparatus of FIGS. 2a and 2b.

FIG. 3 depicts an alternative hologram stack construction. In this embodiment electrically controlled holographic devices are not required. Instead any crystal in which two light beams interfere to produce a spatially modulated birefringence pattern can be used. Lithium niobate, for example is satisfactory in this case. The holographic stack of FIG. 3 comprises alternate electrically controllable polarization switches 37a, b, c, d, and holographic crystals 38a, b, c. The polarization switches are typically potassium dihydrogen phosphate (KDP) cells operated in the longitudinal Pockels mode wherein the Z-axis of the KDP cell is aligned parallel to both the direction of light propagation and an electric field applied to the cell. The thickness of the polarization switches can be of the same order as the holographic crystal plates, namely about 0.1 centimeter.

In operation of the device for recording and reading out data a setup identical to FIGS. 2a and 2b can be used. Data recording, as in the case of the electrically controllable holographic embodiment previously explained, can be accomplished with randomly polarized light but is preferably performed with plane polarized light oriented parallel to the extraordinary axis of the hologram crystals, in other words normal to the plane of the drawings. To record information in any one crystal hologram the other crystals are temporarily removed from the stack and preferably replaced by a material of equivalent transparency and refractive index. This must be done since the recording process is not selective as explained for the prior embodiment. In all other respects, however, the recording procedure is the same as previously described regarding the relative placement of the transparencies, holograms and light beams. Readout, on the other hand, is selective. This is performed with extraordinarily poled light from the laser or light beam deflector normally oriented parallel to the plane of the drawing, that is, perpendicular to the extraordinary axis of the crystals. As previously mentioned, the Z-axis of the KDP polarization switches is aligned parallel to the direction of light propagation. Accordingly, the X- and Y-axis of the KDP cells are transverse to the light propagation and oriented such that each is at an angle of 45° to the light polarization. Thus, in the absence of electrical excitation applied to the polarization switches the light beams pass through unaffected thereby and likewise are unaffected by the holograms in view of being poled orthogonal to the extraordinary axis thereof. To render any crystal hologram sensitive to the light beam passing through it so as to reconstruct the recorded data, the light polarization must be spatially rotated by 90° into parallelism with the extraordinary axis. This is accomplished by applying a longitudinal electric field parallel to the Z-axis of the KDP cell whereupon the polarization of the incident readout light beam is rotated 90° by virtue of the switch operating as a half-wave plate. At the same time the polarization switch on the side of the hologram remote from the laser must also be activated to reorient the light beam in the horizontal polarization, in other words perpendicular to the extraordinary axis, to assure that neither the zero order beam nor the diffracted information carrying beam is affected by any subsequent hologram.

It should be understood that it is not essential in this embodiment for the polarization switches to be of the electrically activated type. As an alternative, mechanically operated polarization rotators can be used, in which case one of the axis (fast or slow) of all the birefringent rotator materials are normally aligned parallel to the light polarization of the readout laser beam. Then the light beam simply passes through all of the rotators without being reoriented and is essentially ineffective for reconstructing any of the recorded data in the various holograms. To readout the data in a given hologram, the polarization rotators on each side of the selected hologram are physically rotated 45° thereby placing their axes at 45° to the readout light beam polarization and enabling operation to proceed in the manner previously described for the electrically controlled polarization switches.

Data storage systems constructed in accordance with the foregoing embodiments provide other advantages in addition to small size and rapid access previously mentioned. For example, data updating is quick and easy. This is performed simply by exposing a particular hologram or stack of holograms to an intense beam for a brief period, say 10 seconds, to erase previously recorded information and then the crystal can be used for recording new data. As a consequence of the ability to erase data in this manner it will be apparent that repetitive or prolonged readout will have the same effect of gradually degrading the holographic recording. Such effects can be minimized, however, by pulsing the readout beam or reducing its intensity as much as practical. In the electrically controllable embodiment utilizing strontium barium niobate, in particular, the reduced intensity of the readout beam can be compensated to some extent by utilizing a readout beam of longer wavelength than that used for recording inasmuch as the hologram is less photosensitive to longer wavelength light.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A holographic data storage apparatus comprising
a plurality of holograms each recorded in a polar crystalline storage medium having a data representative pattern of refractive index inhomogeneities recorded therein by interference between a pair of coherently related light beams incident on said medium, in at least partially superposed relation, under the influence of an electric potential simultaneously applied to the medium for establishing an electric field therein oriented relative to the polar axis of the medium so that the field and light beams interact to produce said refractive index inhomogeneities,
a light source for providing a coherent readout beam directed oppositely to one of the coherently related recording beams,
means for applying to any one of said holograms an electric potential of the same polarity used in recording the respective data representative refractive index inhomogeneity patterns, each hologram being operative upon being energized by the applied electric potential to convert part of the energy of the readout beam to a diffracted data beam carrying the data stored in the energized hologram and operative in the absence of the electric potential to transmit the readout beam without producing a data beam, and
said holograms being arranged in closely spaced front to rear tandem relation thereby forming a horizontally disposed stack of holograms in the path of the readout beam whereby both the readout and data beams propagate through the holograms located to the rear of the energized hologram.

2. The apparatus of claim 1 including a viewing screen positioned to receive the diffracted data beam from the respective holograms for providing a visual display of the readout data and wherein each hologram is so constructed as to direct its data beam onto a common region of said viewing screen.

* * * * *